US012656183B2

(12) United States Patent　(10) Patent No.:　US 12,656,183 B2
Akaba et al.　(45) Date of Patent:　Jun. 16, 2026

(54) TEMPERATURE SENSOR

(71) Applicant: SHIBAURA ELECTRONICS CO., LTD., Saitama (JP)

(72) Inventors: Hiroaki Akaba, Saitama (JP); Takamasa Yoshihara, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 305 days.

(21) Appl. No.: 18/553,469

(22) PCT Filed: Aug. 25, 2022

(86) PCT No.: PCT/JP2022/032042
§ 371 (c)(1),
(2) Date: Sep. 29, 2023

(87) PCT Pub. No.: WO2024/042676
PCT Pub. Date: Feb. 29, 2024

(65) Prior Publication Data
US 2025/0076126 A1　Mar. 6, 2025

(51) Int. Cl.
*G01K 1/143* (2021.01)
*G01K 1/08* (2021.01)
*G01K 1/14* (2021.01)

(52) U.S. Cl.
CPC ............... *G01K 1/143* (2013.01); *G01K 1/08* (2013.01); *G01K 1/14* (2013.01); *G01K 1/146* (2013.01)

(58) Field of Classification Search
CPC .......... G01K 1/143; G01K 1/08; G01K 1/146; G01K 1/14

USPC ........................................................ 374/208
See application file for complete search history.

(56) References Cited

U.S. PATENT DOCUMENTS

| | | | | |
|---|---|---|---|---|
| 5,088,836 A | * | 2/1992 | Yamada | G01K 1/143 374/E1.019 |
| 2018/0017446 A1 | | 1/2018 | Yoshihara et al. | |
| 2020/0393306 A1 | | 12/2020 | Yoshihara et al. | |
| 2022/0373399 A1 | * | 11/2022 | Yoshihara | G01K 1/12 |

FOREIGN PATENT DOCUMENTS

| | | | | | |
|---|---|---|---|---|---|
| DE | 102006054026 A1 | * | 5/2008 | ............ | G01K 1/143 |
| EP | 2241870 A1 | * | 10/2010 | ............ | G01K 1/143 |
| JP | S59100227 U | | 7/1984 | | |
| JP | H03-156331 A | | 7/1991 | | |

(Continued)

OTHER PUBLICATIONS

Office action for Japanese patent application No. JP2023-506268 dated Apr. 5, 2026.

(Continued)

*Primary Examiner* — Mirellys Jagan
(74) *Attorney, Agent, or Firm* — McDonald Hopkins LLC

(57) ABSTRACT

A temperature sensor includes: a sensor element including a thermosensitive body configured to detect a temperature of a measurement object, and a protector that internally houses the thermosensitive body; and an elastic bracket that holds the protector and is configured to apply elastic force to the protector toward the measurement object. The elastic bracket includes a first spring piece holding the protector, a second spring piece facing the first spring piece, and a connection piece of the first spring piece and the second spring piece.

8 Claims, 6 Drawing Sheets

(56) References Cited

FOREIGN PATENT DOCUMENTS

| JP | 2003077706 | A | 3/2003 |
| JP | 2004239630 | A | 8/2004 |
| JP | 2014178258 | A | 9/2014 |
| JP | 6005893 | B1 | 10/2016 |
| JP | 6674070 | B1 | 3/2020 |

OTHER PUBLICATIONS

Written Opinion (form ISR-237) for PCT/JP2022/032042 dated Oct. 27, 2022.
International Search Report (form ISR-210) for PCT/JP2022/032042 dated Oct. 27, 2022.

\* cited by examiner step1 step2 var1 var2

TEMPERATURE SENSOR

CROSS-REFERENCE TO RELATED APPLICATIONS

This is a National Stage application of PCT international application PCT/JP2022/032042, filed on Aug. 25, 2022, the content of which is incorporated herein by reference in its entirety.

TECHNICAL FIELD

The present invention relates to a sensor that measures a temperature of a measurement object while being pressed against the measurement object by using elastic force.

BACKGROUND ART

As a temperature sensor pressed against a measurement object by using elastic force, for example, a temperature sensor disclosed in Patent Literature 1 and a temperature sensor disclosed in Patent Literature 2 are known.

Patent Literature 1 discloses a temperature sensor that is attached to a rectangular electric wire to detect a temperature of the electric wire. The temperature sensor includes a sensor holder, a sensor body that is held by the sensor holder and includes a thermosensitive body and lead wires electrically connected to the thermosensitive body, and a clip that is fixed to the sensor holder and presses the electric wire against the sensor body by elastic force.

According to Patent Literature 1, a plurality of parts (a sensor holder, an electric wire holder, and a pad) made of a resin are used in addition to the clip in order to attach the temperature sensor to a coil. Therefore, the number of parts is large. Patent Literature 2 solves the issue. In Patent Literature 2, a temperature sensor including a thermosensitive body, and a metal bracket attaching the temperature sensor to a coil are provided. The bracket includes a bracket main body clamping the coil by elastic force, and a joining portion joined to the temperature sensor. The bracket main body includes a clamping portion internally clamping the coil, and a heat collection portion protruding to outside of the clamping portion and thermally coupled to the temperature sensor.

CITATION LIST

Patent Literature

Patent Literature 1: JP 6005893 B2
Patent Literature 2: JP 6674070 B2

SUMMARY OF INVENTION

Technical Problem

The temperature sensor disclosed in Patent Literature 2 is on the premise that the coil as a measurement object is clamped by the clamping portion. In other words, the temperature sensor disclosed in Patent Literature 2 requires provision of the clamping portion and a work for clamping the coil.

Therefore, an object of the present invention is to provide a temperature sensor that is pressed against a measurement object by elastic force, and is easily mounted on the measurement object while having a simpler configuration.

Solution to Problem

A temperature sensor according to the present invention includes: a sensor element including a thermosensitive body configured to detect a temperature of a measurement object, and a protector that internally houses the thermosensitive body; and an elastic bracket that holds the protector and is configured to apply elastic force to the protector toward the measurement object.

The elastic bracket according to the present invention includes a first spring piece holding the protector, a second spring piece facing the first spring piece, and a connection piece of the first spring piece and the second spring piece.

In the bracket according to the present invention, the first spring piece preferably includes a second surface facing the second spring piece, and a first surface on a back side of the second surface, and the protector is preferably held in contact with the first surface.

In the bracket according to the present invention, the first spring piece preferably includes a second surface facing the second spring piece, and a first surface on a back side of the second surface, and the protector is preferably held in contact with the second surface.

The protector according to the present invention is preferably held by a holding piece integrally provided on the first spring piece by crimping.

The protector according to the present invention preferably includes a held portion held by the holding piece, and a thermosensitive portion sealing the thermosensitive body, and the held portion is preferably thinner in thickness than the thermosensitive portion.

In the temperature sensor according to the present invention, the protector is preferably held in contact with the first surface, and the thermosensitive portion is preferably greater in height than the holding piece holding the held portion with the first surface as a reference.

In the temperature sensor according to the present invention, the protector preferably includes a held portion held by the holding piece, and a thermosensitive portion sealing the thermosensitive body. The thermosensitive portion includes a flat thermosensitive surface to come into surface contact with the measurement object, and a supported surface opposed to the thermosensitive surface in parallel and supported by a flat surface of the first spring piece.

The present invention provides a temperature measurement structure including: a measurement object; a supporter facing the measurement object; and a temperature sensor mounted between the measurement object and the supporter.

In the temperature measurement structure according to the present invention, the temperature sensor includes a sensor element including a thermosensitive body configured to detect a temperature of the measurement object and a protector that internally houses the thermosensitive body, and a bracket including a U-shaped compression spring that holds the protector.

The bracket according to the present invention includes a first spring piece configured to apply elastic force to the protector toward the measurement object, a second spring piece pressed against the supporter by the elastic force.

Advantageous Effects of Invention

The temperature sensor according to the present invention includes the U-shaped elastic bracket. Accordingly, in the temperature sensor, in particular, the configuration of the elastic bracket is simple. Further, when the measurement object and a supporting surface facing the measurement object, for example, a lower wall surface exist, the temperature sensor can be mounted only by inserting the elastic bracket into a measurement space therebetween. In other words, the temperature sensor is easily mounted on the measurement object.

In addition, the elastic bracket is provided as a single member in which the connection piece, the first spring piece, and the second spring piece are continued, by stamping and bending process using the plate member made of the metal material. Accordingly, the temperature sensor is fabricated at a low cost. In particular, since the holding piece fixing the protector is integrally formed with the first spring piece, the elastic bracket is excellent in cost and holding workability by crimping, as compared with a case where the holding piece is provided as a separate member.

DESCRIPTION OF EMBODIMENTS

A temperature sensor 1 according to an embodiment is described.

Figure 1:
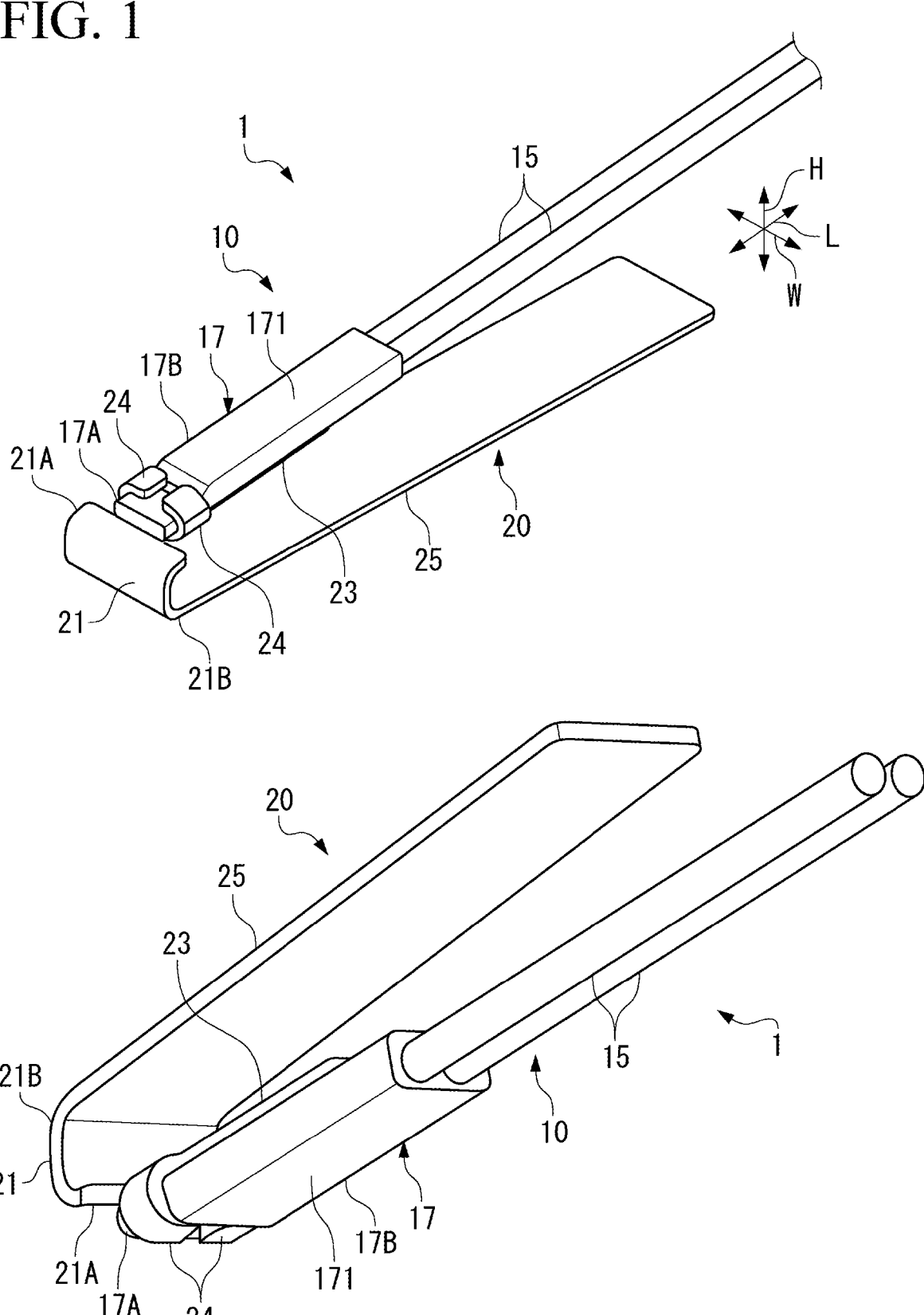
FIG. 1 is a perspective view illustrating a temperature sensor according to a first embodiment.

As illustrated in FIG. 1, the temperature sensor 1 includes a sensor element 10 including a thermosensitive body 11 that is a main element of temperature measurement, and an elastic bracket 20 that holds the sensor element 10 and presses the sensor element 10 against a measurement object by elastic force. Examples of the measurement object by the temperature sensor 1 include a stator coil and a bus bar of an electric motor disclosed in, for example, Patent Literatures 1 and 2, including a flat surface to be detected against which the sensor element 10 is pressed by elasticity. In the following, configurations of the sensor element 10 and the elastic bracket 20 are described in order.

Figure 2:
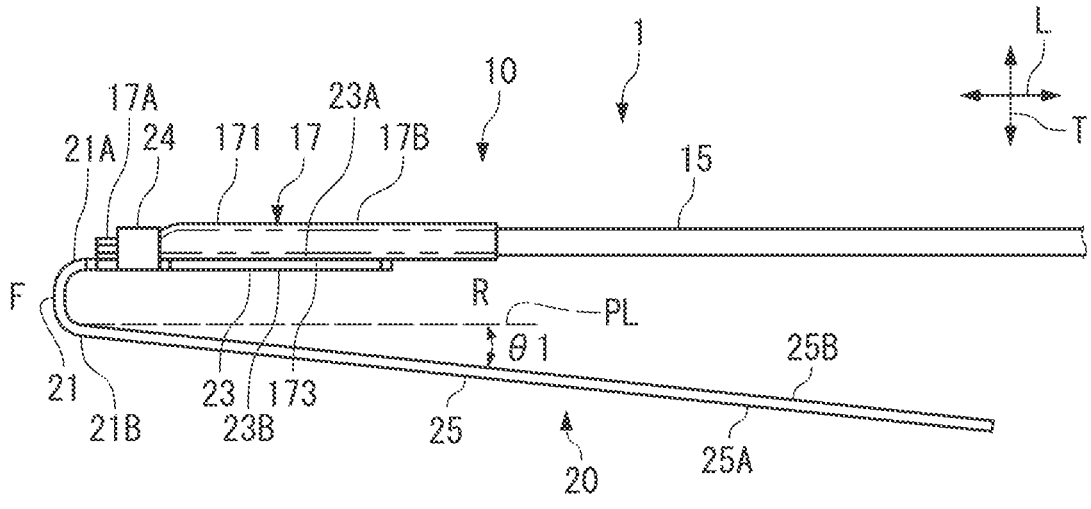
FIG. 2 is a side view of the temperature sensor according to the first embodiment and a plan view illustrating main portions of a sensor element.
Figure 2:
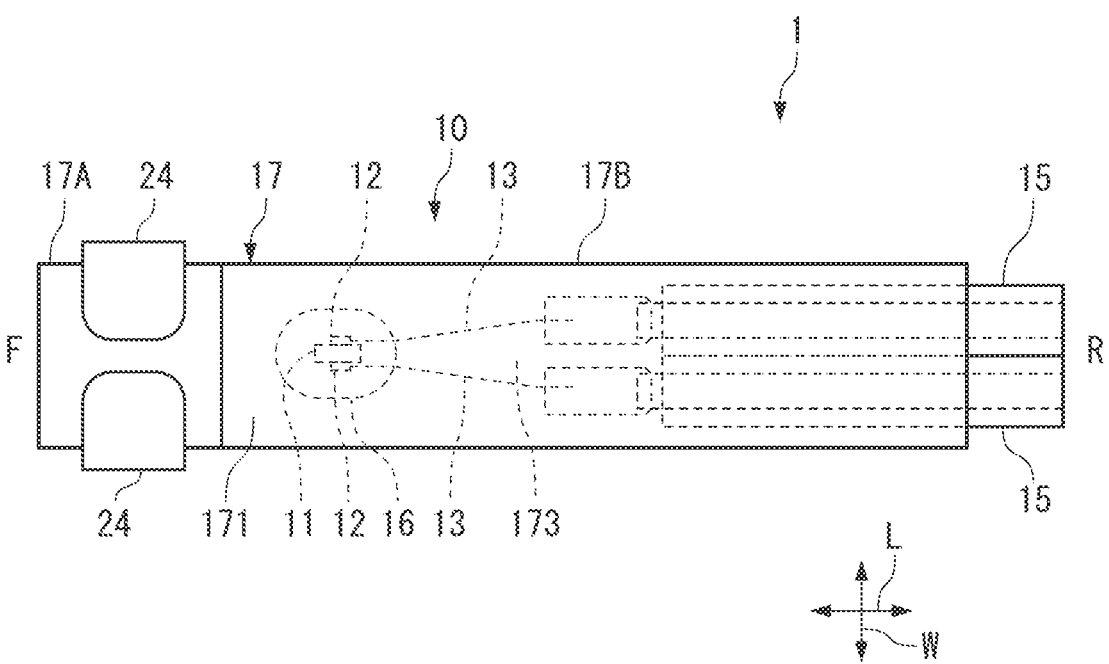

[Sensor Element 10: FIG. 1 and FIG. 2]

The configuration of the sensor element 10 is described with reference to FIG. 1 and FIG. 2.

The sensor element 10 includes the thermosensitive body 11 detecting a temperature, electrodes 12 provided on opposed two surfaces of the thermosensitive body 11, paired lead wires 13 electrically connected to the thermosensitive body 11 through the respective electrodes 12, and a sealing layer 16 covering the thermosensitive body 11. The sensor element 10 further includes an electrically insulating protector 17 that internally houses and seals the thermosensitive body 11 covered with the sealing layer 16 and the lead wires 13 a part of which is covered with the sealing layer 16.

A metal oxide or a metal having characteristics in which an electric resistance value is varied by change in temperature is used for the thermosensitive body 11. A constant current is caused to flow through the thermosensitive body 11 through the paired lead wires 13, a voltage between the electrodes 12 of the thermosensitive body 11 is measured by a measurement device, a resistance value is determined from Ohm's law (E=IR), and a temperature is accordingly detected. As the metal oxide, a thermistor (Thermally Sensitive Resistor) is suitably used, and an NTC thermistor (Negative Temperature Coefficient Thermistor) having a negative temperature coefficient is typically used. As the metal, platinum (for example, Pt100; JIS-C1604) is suitably used.

The electrodes 12 electrically connect the thermosensitive body 11 and the lead wires 13, and are preferably made of a noble metal such as gold and platinum.

The lead wires 13 are conductive wires causing the constant current to flow through the thermosensitive body 11, and a metal material high in electric conductivity, typically, copper is used for the lead wires 13. A Dumet wire is suitably used as each of the lead wires 13. The Dumet wire is a composite wire in which an inner layer made of an iron-nickel alloy is clad in an outer layer made of copper are clad.

As the sealing layer 16, glass is used. In particular, in a case where the Dumet wires are used for the lead wires 13, breakage of the sealing layer 16 caused by thermal expansion of the lead wires 13 is prevented because a linear expansion coefficient of an iron-nickel alloy is approximate to a linear expansion coefficient of glass.

The lead wires 13 are electric wires causing the constant current to flow through the thermosensitive body 11. Electric wires are further connected to the lead wires 13 that are electric wires directly connected to the thermosensitive body 11 in some cases, and the electric wires indirectly connected to the thermosensitive body 11 are referred to as relay wires 15.

The sealing layer 16 is provided to prevent occurrence of chemical change and physical change on the thermosensitive body 11 by enclosing and sealing the thermosensitive body 11 in an airtight state. As the sealing layer 16, glass is preferably used; however, a resin material may be used or the sealing layer 16 may be omitted depending on an environment where the temperature sensor 1 is used.

The protector 17 protects the thermosensitive body 11 and the lead wires 13 from external force such as impact applied from outside, and contributes to electric insulation between the thermosensitive body 11 and the measurement object.

The protector 17 is made of, for example, a fluorine resin such as polytetrafluoroethylene (PTFE) and tetrafluoroethylene-perfluoroalkylvinylether copolymer (PFA). Besides these resin materials, the protector 17 can be made of an appropriate resin material irrespective of a thermoplastic resin and a thermosetting resin. For example, the protector 17 can be manufactured by performing injection molding on a cavity of a mold while the thermosensitive body 11 and the like covered with the sealing layer 16 are disposed in the cavity.

When the protector 17 is made of a transparent resin, appearance inspection of the thermosensitive body 11 is possible by seeing through the protector 17.

The protector 17 according to the present embodiment has a substantially rectangular-parallelepiped appearance as an example.

The protector 17 includes a held portion 17A held to the elastic bracket 20 by crimping, and a thermosensitive portion 17B sealing the thermosensitive body 11 and the like. The held portion 17A and the thermosensitive portion 17B are equal in dimension in a width direction w but are different in dimension in a thickness direction T. The held portion 17A is thinner than the thermosensitive portion 17B. Note that, in the sensor element 10, a side on which the held portion 17A of the protector 17 is provided is defined as front side (F), and a side from which the relay wires 15 are drawn is defined as rear side (R) as illustrated in FIG. 2. The definition includes relative meanings. Further, in the sensor element 10, a longitudinal direction L, the width direction W, and the thickness direction T are defined as illustrated in FIG. 2. The held portion 17A is pressurized by holding pieces 24 of the elastic bracket 20. Therefore, for example, the thermosensitive body 11 that may be damaged is disposed in the thermosensitive portion 17B while avoiding the held portion 17A. Further, the reason why the held portion 17A is thinner than the thermosensitive portion 17B is because, when the thermosensitive portion 17B is made higher in height than the holding pieces 24 crimping the held portion 17A, the holding pieces 24 do not inhibit contact of the thermosensitive portion 17B to a measurement object 100.

This is described with reference to the drawings in description of the elastic bracket 20.

The protector 17 includes a first surface 171 and a second surface 173 opposed to each other. The first surface 171 and the second surface 173 are both flat, and are parallel to each other. When the temperature sensor 1 measures a temperature of the measurement object 100 (see FIG. 3), for example, an electric coil, the first surface 171 is pressed against the measurement object 100. Accordingly, the first surface 171 of the thermosensitive portion 17B serves as a thermosensitive surface receiving heat from the measurement object 100. A first surface 23A of a first spring piece 23 of the elastic bracket 20 holding the protector 17 and the second surface 173 are brought into surface contact with each other. In the present embodiment, the first surface 171 is provided only on the thermosensitive portion 17B, whereas the second surface 173 is continuously provided on the held portion 17A and the thermosensitive portion 17B.

The sensor element 10 is not limited to the present embodiment, and an appearance shape of the protector 17 is not limited to the rectangular parallelepiped shape, and can be changed to a shape corresponding to the measurement object. For example, in a case where a temperature measurement surface of the measurement object has a recessed arc surface, the protector can have a cylindrical shape adapting to the recessed arc surface. Further, in a case where the temperature measurement surface has a recessed polygonal surface, the protector 17 can have a polygonal shape adapting to the recessed polygonal surface. In a case of the protector having the cylindrical shape, the second surface 173 is an arc surface. In a case of the protector having the polygonal shape, the second surface 173 is a polygonal surface. However, to obtain a stable supporting state by the first surface 23A of the first spring piece 23, the second surface 173, namely, a supported surface is preferably a flat surface parallel to the first surface 171, namely, the thermosensitive surface. Further, the thermosensitive body 11 may be covered with a protection member such as a tube made of an insulation material, in place of the protector 17. Further, the protector 17 may be made of not only one material but also a plurality of types of stacked materials.

[Elastic Bracket 20: FIG. 1 and FIG. 2]

Next, the configuration of the elastic bracket 20 is described with reference to FIG. 1 and FIG. 2.

The elastic bracket 20 has a function of pressing the protector 17 of the sensor element 10 against the measurement object 100 by elastic force, in addition to the function of holding the sensor element 10. The elastic bracket 20 is preferably made of a metal material; however, the elastic bracket 20 may be made of a resin material.

[Configuration of Elastic Bracket 20: FIG. 1 and FIG. 2]

The elastic bracket 20 includes a compression plate spring having a U-shape as a basic configuration, and the protector 17 is held by the compression plate spring. As is well known, the compression spring is a spring generating elastic force by receiving a compression load. The elastic bracket 20 includes a connection piece 21 that has a U-shape and includes a first connection piece 21A and a second connection piece 21B. The elastic bracket 20 includes the first spring piece 23 that communicates with the one first connection piece 21A of the connection piece 21 and holds the protector 17, and a second spring piece 25 that communicates with the other second connection piece 21B of the connection piece 21. The elastic bracket 20 can be fabricated in such a manner that a material plate integrally including portions corresponding to the connection piece 21, the first spring piece 23, and the second spring piece 25 is fabricated by press forming of a metal plate, and mechanical processing is performed on the material plate.

In the elastic bracket 20, the first spring piece 23 and the second spring piece 25 are inclined to and face each other through a predetermined inclination angle $\theta1$. When the elastic bracket 20 receives a load such that an interval between a free end of the first spring piece 23 and a free end of the second spring piece 25 is reduced, elastic force is generated on the connection piece 21. The elastic bracket 20 uses the elastic force to press the protector 17 against the measurement object 100 and to maintain the temperature sensor 1 at a predetermined position necessary for temperature measurement of the measurement object 100.

[Connection Piece 21: FIG. 1 and FIG. 2]

In the case where the elastic bracket 20 is made of a metal material having a plate shape, the connection piece 21 is formed by bending a flat plate member made of a metal material. Examples of an adopted metal material include an iron-based alloy, stainless steel, and phosphor bronze. Settling caused by usage of the elastic bracket 20 as the spiring easily occurs in the connection piece 21 as compared with the first spring piece 23 and the second spring piece 25. Therefore, settling in the connection piece 21 is preferably considered when the material is selected. Further, in consideration of elastic force required for the elastic bracket 20 including the connection piece 21, a thickness of the elastic bracket 20 is selected.

[First Spring Piece 23: FIG. 1 and FIG. 2]

The first spring piece 23 includes the first surface 23A and a second surface 23B that are flat and parallel to each other. The protector 17 of the sensor element 10 is held by the first spring piece 23 while being placed on the first surface 23A through the second surface 173. The first spring piece 23 includes the paired holding pieces 24 in order to hold the protector 17. The holding pieces 24 are provided on respective sides of the first spring piece 23 in the width direction W and near the first connection piece 21A of the connection piece 21. The protector 17 is placed on the first spring piece 23 such that the held portion 17A is disposed in a region corresponding to the holding pieces 24, and is crimped and fixed to the first spring piece 23 by crimping the held portion 17A with the holding pieces 24. The thermosensitive portion 17B positioned on the rear side (R) of the held portion 17A fixed by the holding pieces 24 is simply supported by the first spring piece 23 without receiving mechanical restraining force.

As an example, the first spring piece 23 does not support a partial region of the protector 17 in the longitudinal direction L; however, the first spring piece 23 can press the protector 17 against the measurement object 100 by elastic force in order to measure the temperature. Therefore, a trouble such as detachment of the sensor element 10 from the protector 17 does not occur. An entire region of the protector 17 in the longitudinal direction L may be supported by the first spring piece 23, and the first spring piece 23 may extend beyond the protector 17 in the longitudinal direction L as a matter of course. In other words, a length L23 of the first spring piece 23 and a length L17 of the protector 17 (thermosensitive portion 17B) have relationship of any of L23<L17, L23=L17, and L23>L17. In a case of L23<L17, L23≥½×L17 is suitable for sufficiently pressing the protector 17 against the measurement object 100. In a case of L23>L17, even when the first spring piece 23 is longer than necessary, the first spring piece 23 does not contribute to pressing of the protector 17 against the measurement object 100 anymore. Therefore, L23≤L17 is preferable.

As a suitable example for ensuring secure supporting of the protector 17, a dimension of the first spring piece 23 and a dimension of the protector 17 in the width direction W are equal to each other, namely, W23=W17. However, the dimension of the first spring piece 23 and the dimension of the protector 17 in the width direction W may satisfy W23<W17 or W23>W17 as long as the protector 17 can be supported with no trouble.

Crimping is used as fixing means for fixing the protector 17 of the sensor element 10 to the first spring piece 23; however, the present invention is not limited thereto. For example, any other fixing means such as fixing by fastening, fixing by an adhesive, and fixing by binding can be adopted. Fixing using the holding pieces 24 does not require other member such as a bolt as a fastening means. Therefore, fixing by crimping can reduce the number of necessary members. In addition, crimping by crimping the holding pieces 24 is high in reliability of mechanical restraint, and can realize holding of the sensor element 10 for a long period.

[Second Spring Piece 25: FIG. 1 and FIG. 2]

Next, the second spring piece 25 is described.

The second spring piece 25 presses the protector 17 held by the first spring piece 23 against the measurement object 100 by elastic force by abutting on, for example, a supporting surface provided to face the measurement object 100.

To exert the function, the second spring piece 25 has the inclination angle $\theta 1$ ($\theta 1 > 0$ degrees) to the first spring piece 23. In the present invention, the inclination angle $\theta 1$ is an angle formed by the second spring piece 25 and a virtual line PL parallel to the first spring piece 23 as illustrated in FIG. 2. When the inclination angle $\theta 1$ is 0 degrees, it is difficult to generate the elastic force for pressing the first spring piece 23 against the measurement object 100 because the first spring piece 23 and the second spring piece 25 are parallel to each other. The generated elastic force is increased as the inclination angle $\theta 1$ is increased. Therefore, the inclination angle $\theta 1$ is preferably increased within an allowable range. However, a dimension of a measurement space 207 (see FIG. 3, details thereof are described below) where the elastic bracket 20 is disposed is preferably considered. For example, when the inclination angle $\theta 1$ is excessively large whereas the dimension in a height direction (H) in which the elastic force is generated is small, a burden for inserting the elastic bracket 20 into the measurement space 207 is increased. As a result, working efficiency is inhibited, or the protector 17 is pressed against the measurement object 100 with a load more than necessary, which may damage the protector 17.

The dimensions of the second spring piece 25 in the longitudinal direction L and the width direction W are not particularly limited as long as the second spring piece 25 exerts the function. In the present embodiment, the second spring piece 25 has the dimension in the longitudinal direction L necessary for exposing a rear end part of the second spring piece 25 to outside when the temperature sensor 1 is disposed at the predetermined position where the temperature measurement of the measurement object 100 is performed (hereinafter, simply referred to as predetermined position). As for the width direction W, a case where the dimension of the second spring piece 25 is greater than the dimension of the first spring piece 23 is illustrated as an example.

Figure 3:
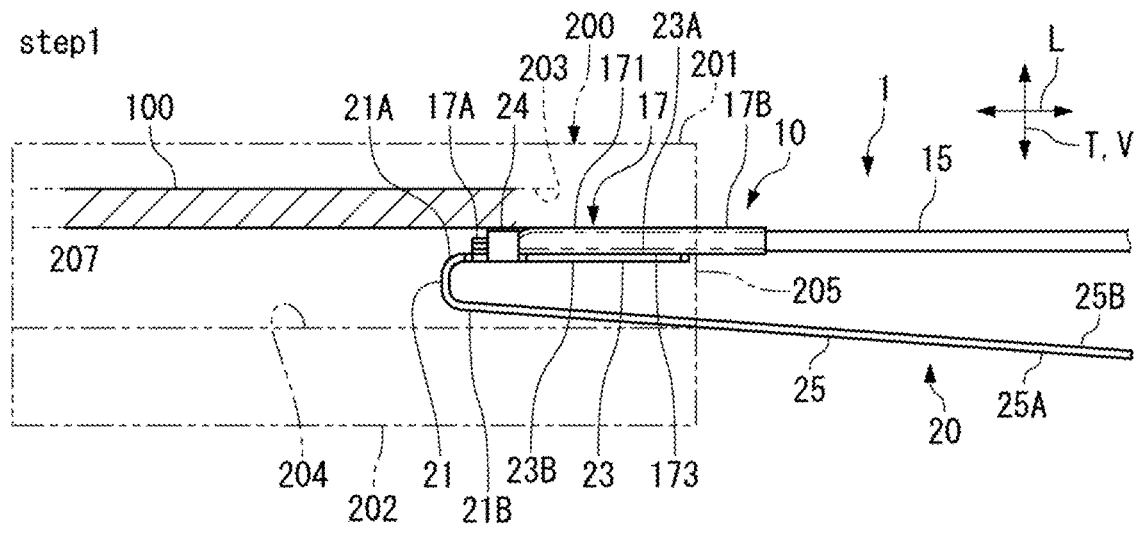
FIG. 3 is a diagram illustrating steps of mounting the temperature sensor according to the first embodiment on a measurement object.
Figure 3:
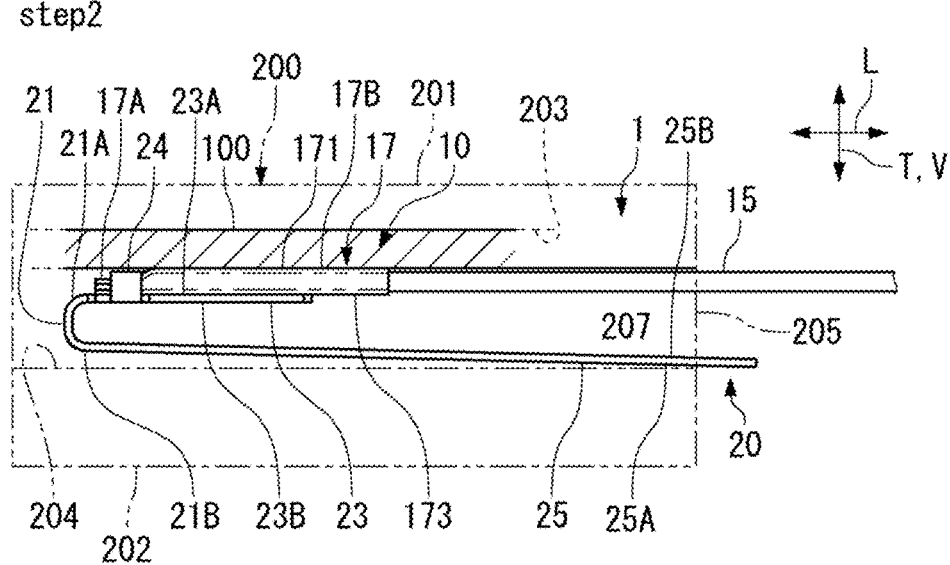

[Mounting of Temperature Sensor 1 at Predetermined Position: FIG. 3]

Next, a procedure of mounting the temperature sensor 1 at the predetermined position in order to measure the temperature of the measurement object 100 is described with reference to FIG. 3.

The measurement object 100 described here is supported by a holder 200. The holder 200 includes an upper wall 201 and a lower wall 202 provided with an interval from the upper wall 201 in a vertical direction V. The upper wall 201 and the lower wall 202 respectively include an upper wall surface 203 and a lower wall surface 204. The measurement object 100 is fixed to the upper wall surface 203 of the upper wall 201, and the temperature sensor 1 is mounted in the measurement space 207 between the measurement object 100 and the lower wall surface 204. Note that a dimension of the measurement space 207 in the vertical direction V is determined so as to generate elastic force on the elastic bracket 20.

More specifically, the temperature sensor 1 is inserted from the connection piece 21 side of the elastic bracket 20 into the measurement space 207 through an opening 205 of the holder 200 (step 1 in FIG. 3). At this time, the first surface 171 of the protector 17 supported by the first spring piece 23 of the elastic bracket 20 comes into surface contact with the measurement object 100. On the other hand, the second spring piece 25 of the elastic bracket 20 abuts on the lower wall surface 204, and the compression load is accordingly generated on the elastic bracket 20.

After the temperature sensor 1 is pushed toward an innermost part of the measurement space 207 and the protector 17 of the temperature sensor 1 reaches the predetermined position (step 2 in FIG. 3), pushing of the temperature sensor 1 is finished. At this time, the interval between the first spring piece 23 and the second spring piece 25 is narrower than the interval at the start of insertion (step 1 in FIG. 3). Therefore, the elastic force is generated on the elastic bracket 20 in a direction of expanding the interval between the first spring piece 23 and the second spring piece 25. As a result, the first surface 171 of the protector 17 is pressed against the measurement object 100. In addition, the elastic bracket 20 can be fixed to that position because the second spring piece 25 presses the lower wall surface 204 in a downward direction in the drawing.

In the temperature sensor 1 mounted in the measurement space 207, the protector 17 is in contact with the measurement object 100, whereas the holding pieces 24 crimping the held portion 17A are not in contact with the measurement object 100. This is because, when the first surface 23A is regarded as a reference, the protector 17 is greater in dimension in the height direction, namely, higher in height than the holding pieces 24. This structure is realized by making the thickness of the held portion 17A of the protector 17 thinner than the thickness of the thermosensitive portion 17B of the protector 17.

[Effects Achieved by Temperature Sensor 1 (First Embodiment)]

The temperature sensor 1 described above achieves the following effects.

The temperature sensor 1 includes the elastic bracket 20 having the U-shape. Accordingly, in the temperature sensor 1, in particular, the configuration of the elastic bracket 20 is simple. Further, when the measurement object 100 and the supporting surface facing the measurement object 100, for example, the lower wall surface 204 exist, the temperature sensor 1 can be mounted only by inserting the elastic bracket 20 into the measurement space 207 therebetween. In other words, the temperature sensor 1 is easily mounted on the measurement object 100.

In addition, the elastic bracket 20 is provided as a single member in which the connection piece 21, the first spring piece 23, and the second spring piece 25 are continued, by stamping and bending process using the plate member made of the metal material. Accordingly, the temperature sensor 1 is fabricated at a low cost. In particular, since the holding pieces 24 fixing the protector 17 are integrally formed with the first spring piece 23, the elastic bracket 20 is excellent in cost and holding workability by crimping, as compared with a case where the holding pieces 24 are provided as separate members.

Further, in the temperature sensor 1, the protector 17 is supported by the first spring piece 23 on the second surface 173 side opposed to the first surface 171, which makes it possible to bring the first surface 171 into direct contact with the measurement object 100.

Thus, according to the temperature sensor 1, it is possible to realize the temperature measurement excelling in thermal responsiveness, as compared with a case where another member is interposed.

Figure 4:
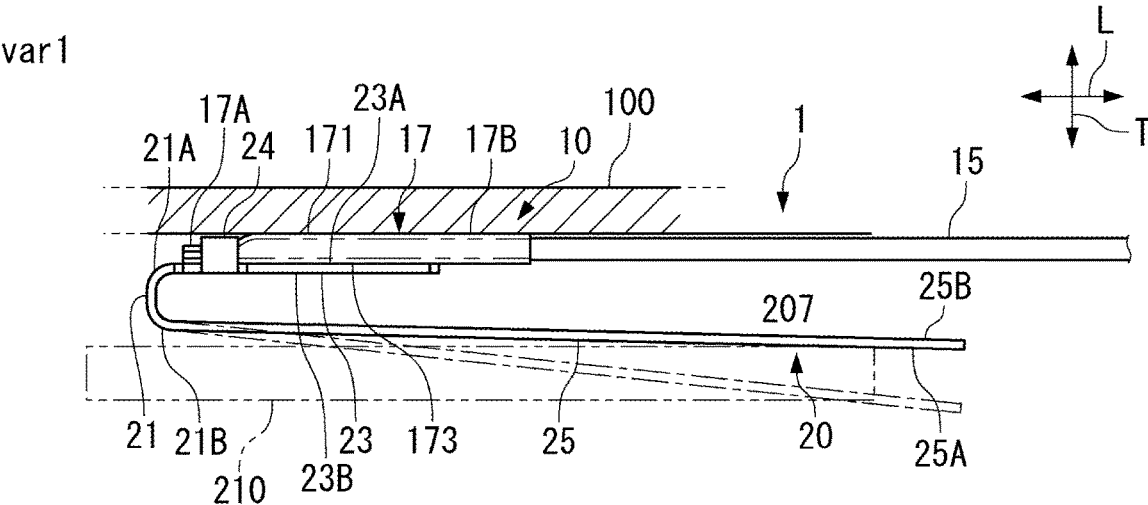
FIG. 4 is a diagram illustrating a first variation (var 1) and a second variation (var 2) of the first embodiment.
Figure 4:
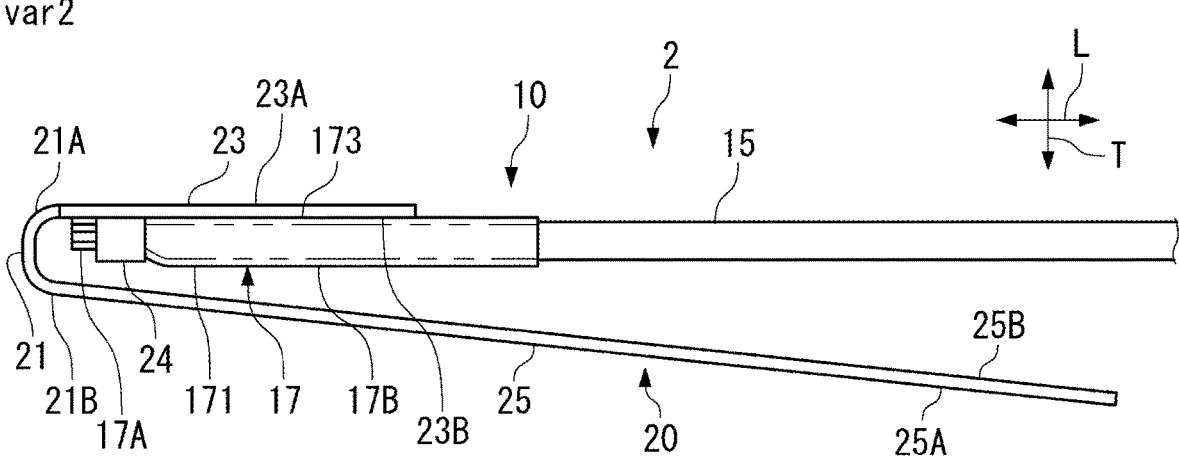
Figure 5:
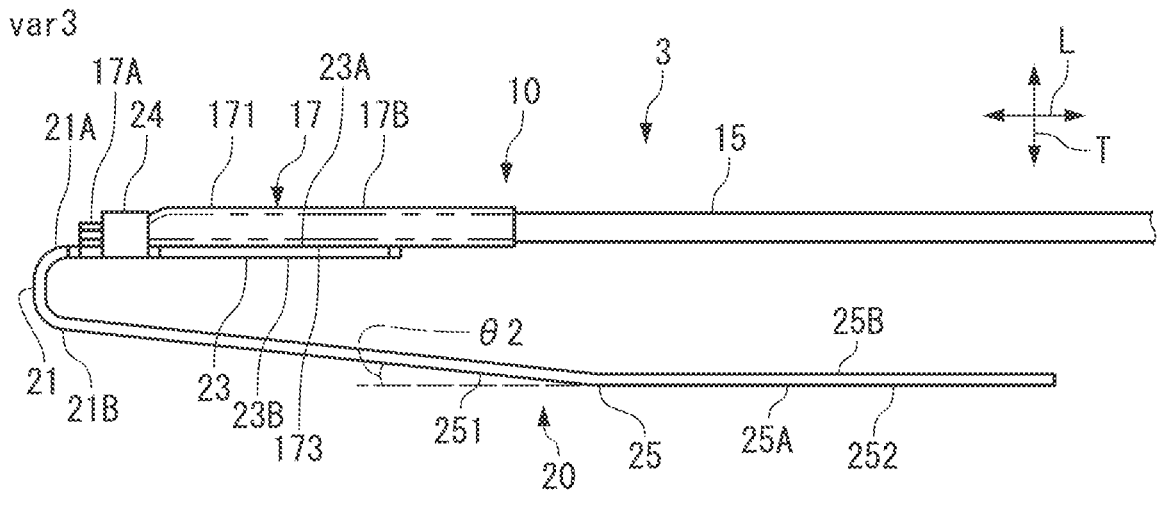
FIG. 5 is a diagram illustrating a third variation (var 3), a fourth variation (var 4), and a fifth variation (var 5) of the first embodiment.
Figure 5:
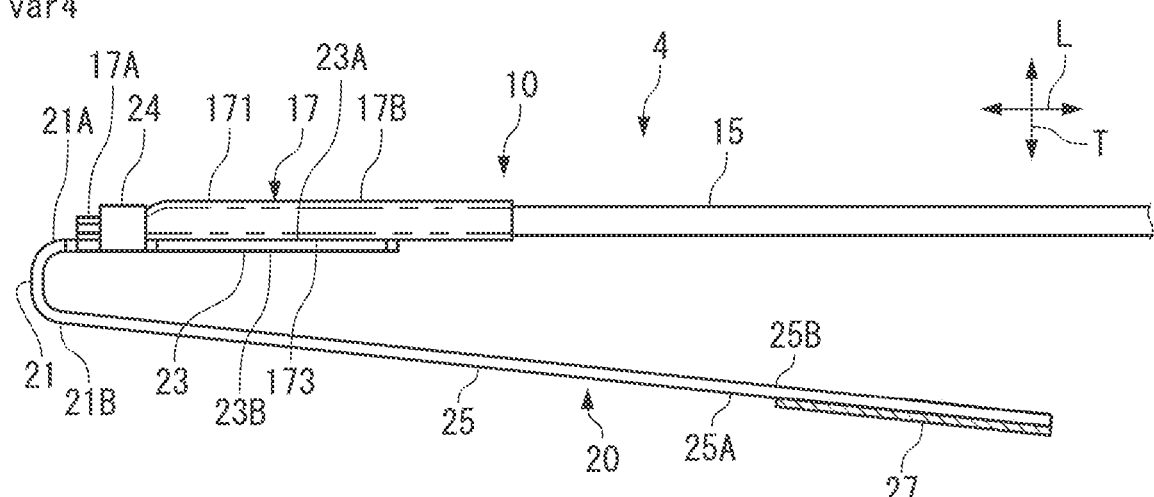
Figure 5:
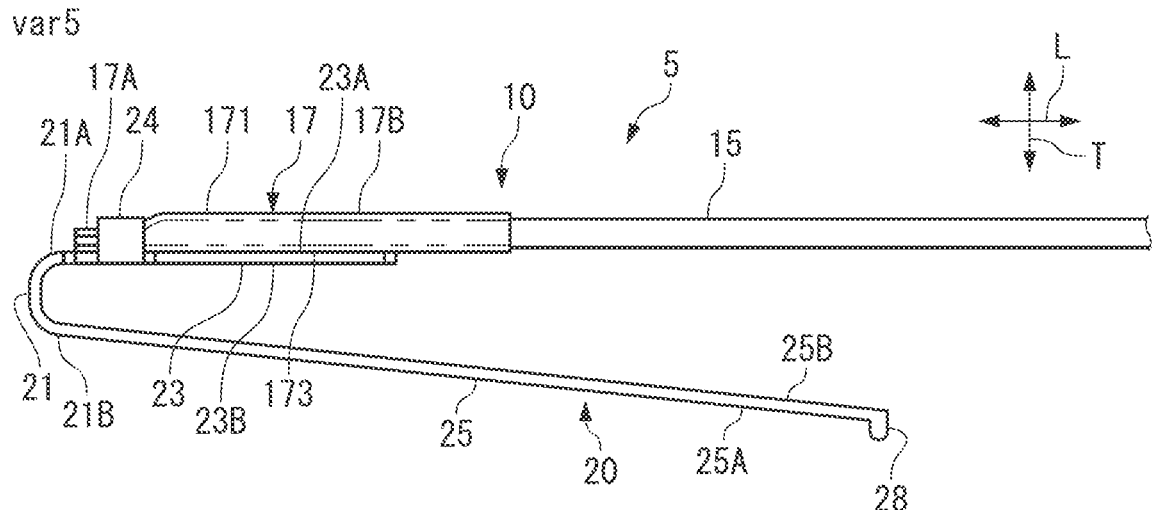

Variations of First Embodiment: FIG. 4 and FIG. 5

Variations of the first embodiment are described below with reference to FIG. 4 and FIG. 5.

The example in which the temperature of the measurement object 100 provided on the holder 200 is measured is described above. When a supporter 210 facing the measurement object 100 with a predetermined interval exists as illustrated in FIG. 4, the temperature sensor 1 can measure the temperature of the measurement object 100 (var 1 in FIG. 4).

Further, as illustrated in FIG. 4, the holding position of the protector 17 to the first spring piece 23 can be changed. More specifically, in a temperature sensor 2 illustrated in FIG. 4, the protector 17 is held by the second surface 23B of the first spring piece 23 facing the second spring piece 25 (var 2 in FIG. 4).

In the temperature sensor 2, most of the protector 17 and the thermosensitive body 11 as a main portion of the sensor element 10 are hidden between the first spring piece 23 and the second spring piece 25. Thus, according to the temperature sensor 2, resistance of the protector 17 to surrounding environment, for example, to change in temperature and atmosphere is high.

Heat from the measurement object 100 is transmitted to the protector 17 and the thermosensitive body 11 through the first spring piece 23. However, when the elastic bracket 20 is made of a metal material having high thermal conductivity, the thermal responsiveness is equivalent to the thermal responsiveness in the case where the protector 17 comes into direct contact with the measurement object 100.

Next, as illustrated in FIG. 5, the second spring piece 25 of a temperature sensor 3 includes a first portion 251 and a second portion 252 that communicate with each other at a predetermined inclination angle θ2 (var 3 in FIG. 5). Appropriately setting the inclination angle θ2 makes it possible to bring the second portion 252 into surface contact with a locking surface when the temperature sensor 3 is disposed at the predetermined position. Accordingly, as compared with the temperature sensor 1 that comes into point (line) contact with the locking surface, friction force of the second portion 252 to the locking surface can be increased. Thus, the temperature sensor 3 can prevent or reduce displacement in the measurement space 207.

As means for preventing or reducing displacement in the measurement space 207, as illustrated in FIG. 5, a non-slip band 27 made of a material having a large friction coefficient can be stuck to a rear end portion on the first surface 25A of the second spring piece 25 (var 4 in FIG. 5). For a similar purpose, in a temperature sensor 5 illustrated in FIG. 5, a stopper claw 28 formed by bending a rear end of the second spring piece 25 can be provided (var 5 in FIG. 5).

Figure 6:
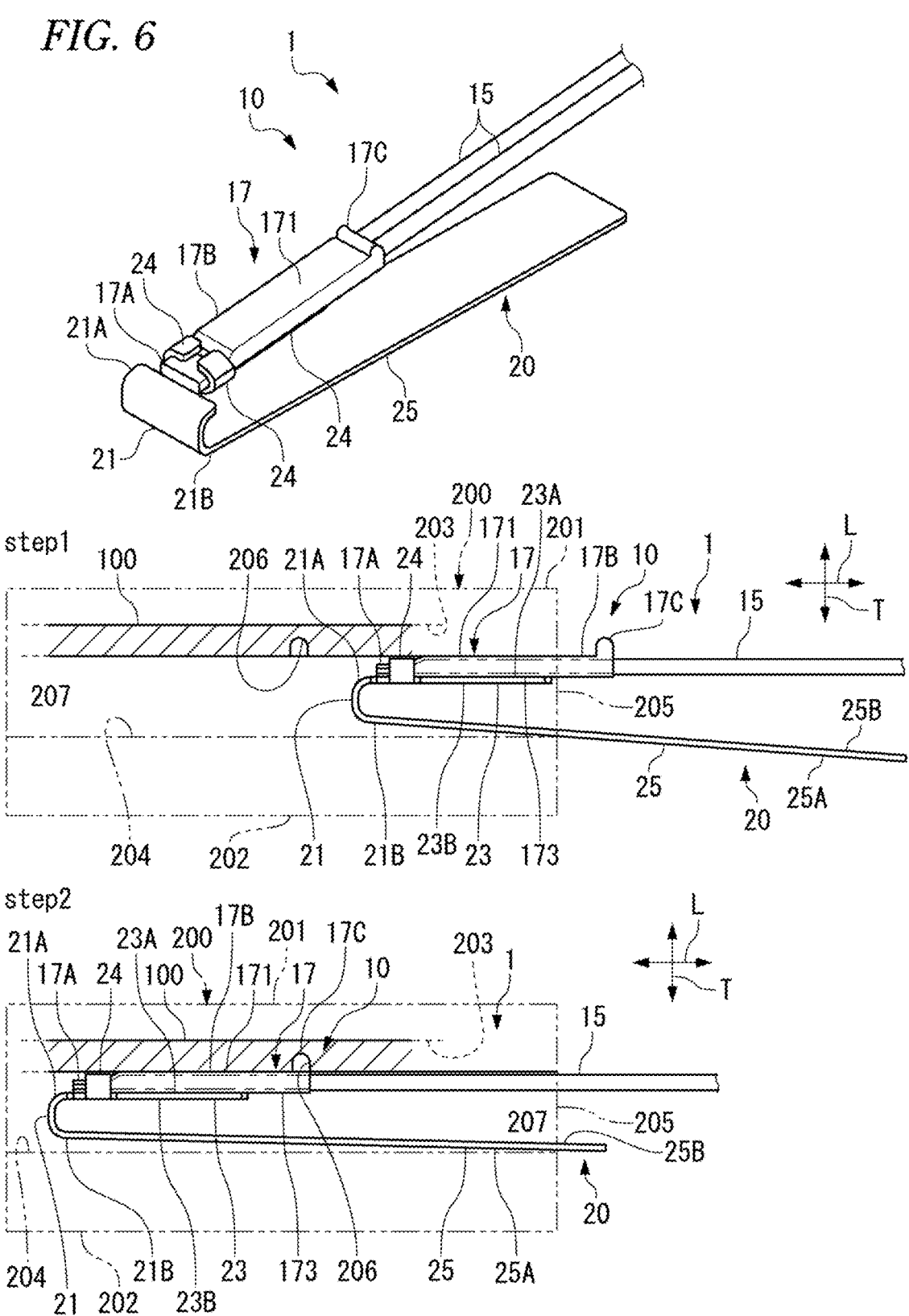
FIG. 6 is a perspective view illustrating a temperature sensor according to a second embodiment and a diagram illustrating steps of mounting the temperature sensor on a measurement object.

Second Embodiment: FIG. 6

Next, a temperature sensor 6 according to a second embodiment is described with reference to FIG. 6.

The temperature sensor 6 includes a configuration for maintaining the temperature sensor 6 at the predetermined position where the temperature measurement is performed, on the protector 17. Except for the configuration, the temperature sensor 6 has the configuration same as the configuration of the temperature sensor 1 according to the first embodiment. Therefore, the temperature sensor 6 is described below by focusing on matters relating to that configuration.

The temperature sensor 6 includes a locking protrusion 17C on the protector 17. As an example, the locking protrusion 17C is provided at a rear end of the protector 17 on the first surface 171 of the protector 17. The locking protrusion 17C protrudes by a predetermined amount from the first surface 171 over an entire region of the protector 17 in the width direction W, and is integrally formed with protector 17.

A locking groove 206 into which the locking protrusion 17C is fitted is formed on the measurement object 100. The locking groove 206 preferably has a shape and a dimension enabling fitting of the locking protrusion 17C without a gap.

The temperature sensor 6 is inserted from the connection piece 21 side of the elastic bracket 20 supporting the protector 17 including the locking protrusion 17C, into the measurement space 207 through the opening 205 of the holder 200 (step 1 in FIG. 6). At this time, the compression load is generated on the elastic bracket 20 as in the first embodiment. When the elastic bracket 20 is further pushed toward the innermost part of the measurement space 207, the elastic bracket 20 advances while the locking protrusion 17C is slid on the measurement object 100 even though illustration is omitted. When the elastic bracket 20 advances up to the predetermined position, the locking protrusion 17C is fitted into the locking groove 206 (step 2 in FIG. 6), and mounting of the temperature sensor 6 on the measurement object 100 is finished.

11

Effects Achieved by Temperature Sensor 6 (Second Embodiment)

The locking protrusion 17C integrally formed with the protector 17 is fitted into the locking groove 206, and the protector 17 is fixed to the elastic bracket 20 by crimping as an example. Therefore, even when vibration or the like occurs around the temperature sensor 6, the temperature sensor 6 stays at the predetermined position, and can stably measure the temperature of the measurement object 100.

The locking protrusion 17C provided on the temperature sensor 6 can be integrally formed with the protector 17 by, for example, injection molding. In the present invention, a member corresponding to the locking protrusion 17C can be fabricated separately from the protector 17 and assembled to the elastic bracket 20; however, integrally forming the locking protrusion 17C makes it possible to suppress a manufacturing cost and to omit a labor of the assembling work.

Note that a forming position of the locking protrusion 17C of the protector 17 is not limited to the rear end of the protector 17. For example, the locking protrusion 17C can be provided at a front end of the protector 17, or at any position between the front end and the rear end.

Further, a configuration substituting for the locking protrusion 17C can be provided on the elastic bracket 20. For example, a locking protrusion can be provided so as to protrude from one side or both sides of the first spring piece 23 in the width direction W. The locking protrusion can be integrally formed with the first spring piece 23.

Furthermore, in the second embodiment, the locking protrusion 17C is provided on the temperature sensor 6, and the locking groove 206 is provided in the measurement object 100; however, the present invention is not limited thereto. A configuration corresponding to the locking protrusion 17C may be provided on the measurement object 100, and a configuration corresponding to the locking groove 206 may be provided in the protector 17.

As described above, the present embodiment can include, between the temperature sensor 6 and the measurement object 100, the configuration preventing the temperature sensor 6 from displacing relative to the measurement object 100.

REFERENCE SIGNS LIST 1, 2, 3, 4, 5, 6 Temperature sensor
10 Sensor element
11 Thermosensitive body
12 Electrode
13 Lead wire
15 Relay wire
16 Sealing layer
17 Protector
17A Held portion
17B Thermosensitive portion
17C Locking protrusion
171 First surface
173 Second surface
20 Elastic bracket
21 Connection piece
21A First connection piece
21B Second connection piece
23 First spring piece
23A First surface
23B Second surface
24 Holding piece

12

25 Second spring piece
25A First portion
25B Second portion
25C First surface
27 Non-slip band
28 Stopper claw
100 Measurement object
200 Holder
201 Upper wall
202 Lower wall
203 Upper wall surface
204 Lower wall surface
205 Opening
206 Locking groove
207 Measurement space
210 Supporter
L Longitudinal direction
T Thickness direction
W Width direction
V Vertical direction
PL Virtual line
θ1, θ2 Inclination angle

The invention claimed is:

1. A temperature sensor, comprising:
a sensor element including a thermosensitive body configured to detect a temperature of a measurement object, and a protector that internally houses the thermosensitive body; and
an elastic bracket that holds the protector and is configured to apply an elastic force to the protector toward the measurement object, wherein
the elastic bracket includes a first spring piece holding the protector, a second spring piece facing the first spring piece, and a connection piece connecting a connected side of the first spring piece to a connected side of the second spring piece,
in a non-load state of the elastic bracket, the first spring piece and the second spring piece are inclined to and face each other through a predetermined inclination angle, and a distance between the first spring piece and the second spring piece is larger at respective free end sides of the first spring piece and the second spring piece than at the respective connected sides,
the first spring piece includes a second surface facing the second spring piece, and a first surface on a back side of the second surface,
the protector is held in contact with the first surface,
the protector is held by a holding piece integrally provided on the first spring piece
the protector includes a held portion held by the holding piece, and a thermosensitive portion sealing the thermosensitive body, and
the held portion is thinner in thickness than the thermosensitive portion.

2. The temperature sensor according to claim 1, wherein the protector is held in contact with the first surface, and the thermosensitive portion is greater in height than the holding piece holding the held portion with the first surface as a reference.

3. The temperature sensor according to claim 1, wherein, the first spring piece and the second spring piece are connected via the connection piece in such a manner that the elastic bracket is U-shaped and that a width direction of the connection piece crosses a longitudinal direction of the first spring piece.

4. A temperature measurement structure, comprising:
a measurement object;

a supporter facing the measurement object; and a temperature sensor mounted between the measurement object and the supporter, wherein the temperature sensor includes a sensor element including a thermosensitive body configured to detect a temperature of the measurement object and a protector that internally houses the thermosensitive body, and an elastic bracket that holds the protector and is configured to apply an elastic force to the protector toward the measurement object, the elastic bracket includes a first spring piece holding the protector, a second spring piece facing the first spring piece, and a connection piece connecting a connected side of the first spring piece to a connected side of the second spring piece, the first spring piece includes a second surface facing the second spring piece, and a first surface on a back side of the second surface, the protector is held in contact with the first or second surface, the protector is held by a holding piece integrally provided on the first spring piece, the protector includes a held portion held by the holding piece, and a thermosensitive portion sealing the thermosensitive body, the held portion is thinner in thickness than the thermosensitive portion, and in a non-load state of the elastic bracket, the first spring piece and the second spring piece are inclined to and face each other through a predetermined inclination angle, and a distance between the first spring piece and the second spring piece is larger at respective free end sides of the first spring piece and the second spring piece than at the respective connected sides.

5. The temperature measurement structure temperature sensor according to claim 4, wherein the first spring piece and the second spring piece are connected via the connection piece in such a manner that the elastic bracket is U-shaped and that a width direction of the connection piece crosses a longitudinal direction of the first spring piece.

6. A temperature sensor, comprising:

a sensor element including a thermosensitive body configured to detect a temperature of a measurement object, and a protector that internally houses the thermosensitive body; and an elastic bracket that holds the protector and is configured to apply an elastic force to the protector toward the measurement object, wherein the elastic bracket includes a first spring piece holding the protector, a second spring piece facing the first spring piece, and a connection piece connecting a connected side of the first spring piece to a connected side of the second spring piece, in a non-load state of the elastic bracket, the first spring piece and the second spring piece are inclined to and face each other through a predetermined inclination angle, and a distance between the first spring piece and the second spring piece is larger at respective free end sides of the first spring piece and the second spring piece than at the respective connected sides, the protector includes a held portion held by the holding piece, and a thermosensitive portion sealing the thermosensitive body, the held portion is thinner in thickness than the thermosensitive portion, the first spring piece includes a second surface facing the second spring piece, and a first surface on a back side of the second surface, the protector is held in contact with the second surface, and the protector is held by a holding piece integrally provided on the first spring piece.

7. The temperature sensor according to claim 6, wherein the thermosensitive portion is greater in height than the holding piece holding the held portion with the second surface as a reference.

8. A temperature sensor comprising:

a sensor element including a thermosensitive body configured to detect a temperature of a measurement object, and a protector that internally houses the thermosensitive body; and an elastic bracket that holds the protector and is configured to apply an elastic force to the protector toward the measurement object, wherein the elastic bracket includes a first spring piece holding the protector, a second spring piece facing the first spring piece, and a connection piece connecting a connected side of the first spring piece to a connected side of the second spring piece, in a non-load state of the elastic bracket, the first spring piece and the second spring piece are inclined to and face each other through a predetermined inclination angle, and a distance between the first spring piece and the second spring piece is larger at respective free end sides of the first spring piece and the second spring piece than at the respective connected sides, the protector includes a held portion held by a holding piece provided on the first spring piece, and a thermosensitive portion sealing the thermosensitive body, and the thermosensitive portion includes a flat thermosensitive surface to come into surface contact with the measurement object, and a supported surface opposed to the thermosensitive surface in parallel and supported by a flat surface of the first spring piece.

* * * * *